United States Patent [19]

Testardi

[11] 3,750,153

[45] July 31, 1973

[54] SINGLE LAYER SUPERCONDUCTING MEMORY DEVICE

[75] Inventor: Louis Richard Testardi, Warren, N.J.

[73] Assignee: Bell Telephone Laboratories, Incorporated, Murray Hill, Berkeley Heights, N.J.

[22] Filed: Feb. 3, 1972

[21] Appl. No.: 223,086

[52] U.S. Cl............... 340/173.1, 307/212, 307/238, 307/245, 307/277, 307/306

[51] Int. Cl........................ H03k 17/84, G11c 11/44

[58] Field of Search.................. 340/173.1; 307/306, 307/245, 298, 277, 238, 212

[56] References Cited

UNITED STATES PATENTS

| | | | |
|---|---|---|---|
| 3,242,471 | 3/1966 | Cooper | 340/173.1 |
| 3,253,159 | 5/1966 | Rosenberger | 340/173.1 X |
| 3,226,534 | 12/1965 | Fitzgerald | 340/173.1 X |
| 3,021,439 | 2/1962 | Anderson | 340/173.1 X |
| 3,466,470 | 9/1969 | Rowell | 306/306 |
| 3,308,282 | 3/1967 | Roth | 340/173.1 X |
| 2,962,216 | 11/1960 | Housman | 340/173.1 X |
| 2,866,842 | 12/1958 | Matthias | 340/173.1 X |

*Primary Examiner*—Bernard Konick
*Assistant Examiner*—Stuart Hecker
*Attorney*—W. L. Keefauver

[57] ABSTRACT

The disclosed memory device is composed of an array of bistable units. The operational portion of each bistable unit is a strip of superconductor material which can, when suitably d-c biased, be switched between a stable superconducting state and a stable resistive state by the passage of current pulses. A current pulse in the same sense as the bias current switches the unit to a stable resistive state. A pulse of opposite polarity produces the superconducting state. Arrays can be constructed to perform memory and logic functions.

8 Claims, 3 Drawing Figures

SINGLE LAYER SUPERCONDUCTING MEMORY DEVICE

BACKGROUND OF THE INVENTION

1. Field of the Invention

Superconducting memory devices and switches.

2. Description of the Prior Art

Three bistable devices involving the superconducting state, which have been developed and suggested for memory type use, are the cryotron, the Josephson tunneling junction, and the superconducting bridge. The cryotron (Solid State Electrons, 1, (1960) page 255–408) is a multilayer device in which each bistable unit contains two superconductive paths, which are inductively coupled to two distinct regions through an insulating layer. The Josephson junction (see for example U. S. Pat. No. 3,281,609) is a multilayer device whose operation involves the tunneling of electrons through a thin insulating layer between two superconducting films. Many realizations of this device require that the insulating layer be approximately 15 angstroms thick or less. The superconducting bridge (see for example, U. S. Pat. No. 3,335,363) which is operationally similar to the Josephson tunneling junction, consists of a narrow superconducting path between two enlarged thin film regions.

SUMMARY OF THE INVENTION

A simple, rugged, superconducting bistable element has been developed in which the operational portion is a strip of superconductor material which can, when suitably dc biased be switched between a stable superconducting state and a stable resistive state by the passage of current pulses of opposite polarity. A current pulse in the same sense as the bias current switches the unit to a stable resistive state. A current pulse of opposite polarity produces the superconducting state. The presently most attractive format for the fabrication of memory or information processing devices using this bistable element invovles thin film technology. Within this format exemplary devices have been fabricated which have been shown capable of performing information storage and information processing functions.

DETAILED DESCRIPTION OF THE INVENTION THE BISTABLE UNIT

Figure 1:
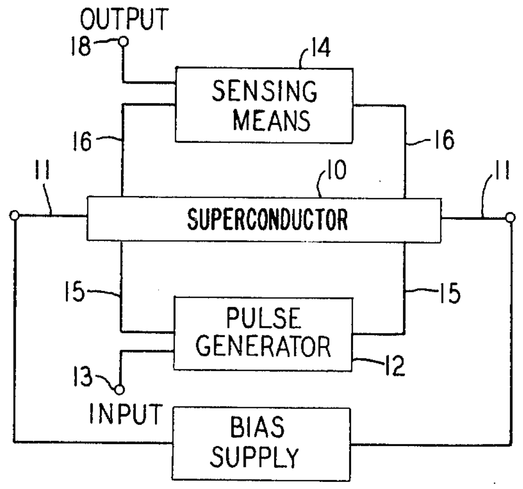
FIG. 1 is a schematic representation of a single bistable unit.

In FIG. 1, the simplicity of the bistable unit can be readily seen. The operational portion 10 is shown as a strip of essentially uniform width composed of a superconductor material. For operation as a bistable unit of the type disclosed here, a *dc* bias current is passed through the strip 10 by means of the bias leads 11. The information to be written into the strip 10 is fed into the pulse generator 12 through the input lead 13. The pulse generator 12 writes the information into the bistable unit by means of pulses of electrical current of either polarity. Current pulses in the same sense as the dc bias current produce a stable resistive state of the strip 10. Pulses of the opposite polarity produce the stable superconducting state of the strip 10. The state of the strip 10 is sensed by the sensing means 14 which detects the presence or absence of electrical resistance along the length of the strip 10. This can be done by, for instance, detecting the presence of absence of a potential difference between the ends of a bistable unit or the derivative of the potential difference. In addition to being switched to the superconducting state by a pulse, this unit can be switched or reset to the superconducting state by interruption of the bias current.

The superconductor strips required by this bistable unit exhibit a hysteresis loop in their I–V characteristic. That is they remain superconducting until the current passing through the strip exceeds a cirtical value, $I_{cu}$. For currents above this critical value this strip becomes resistive and a potential difference can be observed between the ends of the strip. As the current is subsequently reduced the strip remains in the resistive state until the current is reduced below a second critical current, $I_{cl}$. This current ($I_{cl}$) is less than $I_{cu}$. Below $I_{cl}$ the strip once again becomes superconducting with no potential drop along its length.

In the preferred mode of the operation of such a strip as a bistable unit, the dc bias current is between $I_{cl}$ and $I_{cu}$. Current pulses of one polarity sufficient to raise the current through the strip above $I_{cu}$ or of the opposite polarity, to depress the current below $I_{cl}$ are used to switch the strip between the superconducting and resistive states. The resistance of the strip at a current just above $I_{cu}$ is usually approximately 10 percent of the normal state resistance. A current at least 50 percent greater than $I_{cu}$ must be passed through the strip in order to force the strip into the normal state. The normal state is defined here as that resistance reached when the upward branch of the hysteresis loop is within 1 percent of the downward branch. For best operation of the device, it is desirable that the current aiding pulse be sufficiently large to momentarily drive the strip into the normal state.

For conceptual simplicity the bias leads 11, the pulse leads 15, and the sensing leads 16 have been pictured as being separate and discrete. However, in practice, optimum design considerations may lead to multifunctional use of some leads with a consequent reduction in the number of leads attached to the functional element 10.

EXEMPLARY BISTABLE DEVICES

Exemplary bistable units have been constructed using niobium thin films. Films between 100 angstroms and 200 angstroms thick were sputtered onto substrates heated to 1,000°C. These films had a superconducting transition temperature of ~8°K. The current density required to drive these films into the normal state at 4.2°K. was approximately $3 \times 10^8$ amperes per square centimeter (30 milliamperes per square micrometer). An exemplary strip ⅛ millimeter wide and 2 millimeters long was scribed in a sputtered niobium film 140 angstroms thick. The device was operated at 4.2°K. with a bias current of 100 milliamperes. In order to switch the devices a 0.05 $\mu f$ capacitor charged to 10 volts was discharged through the pulse leads 15. The duration of the discharge current pulse was several microseconds. This pulse width was determined by external parameters of the measurement system, such as the resistance of the leads into the cryostat, and does not represent the inherent switching time of the device.

The current pulse thus produced, when in the same sense as the bias current, was sufficient to drive the strip current momentarily beyond the current at which the hysteresis loop closes on itself. After the pulse was over, the sample was in a resistive state with a resistance approximately 10 percent of the resistance at the peak strip current. In this state an output signal of ~3 volts was observed. The film was switched back to the superconducting state by a similar pulse discharge procedure with a current pulse of opposite polarity. There was an attendant loss of output signal. Using leads connected to the strip at various points along its length, it was determined that portions of the strip could be switched to the resistive state while leaving adjacent portions in the superconducting state. Although the device operation generally changes somewhat with temperature, bias and pulse values were found with which the unit could be operated without change of bias or pulse conditions at temperatures up to within 1 or 2°K. below the superconducting critical temperature.

The films used are merely exemplary of the films which may be used in the invention. The material, niobium is exemplary of elements, compounds and alloys, including major amounts of niobium, vanadium and tantalum, which are superconductors known in the art to exhibit similar properties (scaled to their different superconducting transition temperatures). The deposition conditions are also exemplary of conditions which are known in the art to produce films of similar characteristics (such as small crystalline grain size). When the temperature of the substrate is between 500 and 1,300°C., niobium film thicknesses between 75 angstroms and 1,000 angstroms exhibit the superconducting hysteresis properties employed in this invention. Films less than 75 angstroms thick begin to lose their continuity and films thicker than 1,000 angstroms begin to lose the required hysteresis properties. At substrate temperatures below 500° the continuity of the films becomes too poor for reproduceable operation, while above 1,300° C interaction with common substrate materials leads to chemical contamination of the films.

EXEMPLARY MULTISTABLE DEVICES

Figure 2:
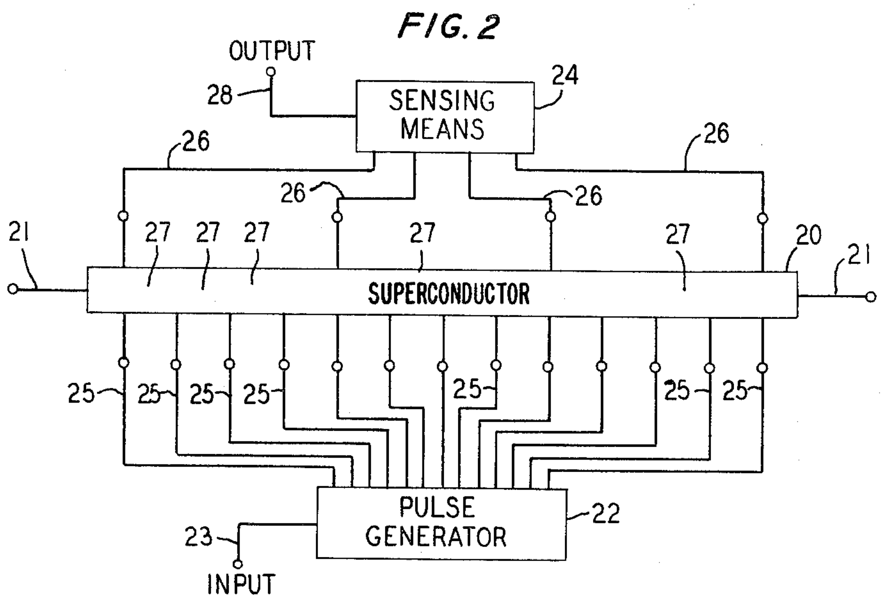
FIG. 2 is a schematic representation of an exemplary array of bistable units.

FIG. 2 shows an exemplary multistable device which combines the memory function with the capacity to perform arithmetic operations. Once again the functional element 20 is a strip of superconductor material and the strip 20 is dc biased through the bias leads 21. The input information is fed into the pulse generator 22 through the input port 23 and pulses of either polarity are fed into the strip 20 through the pulse leads 25 in conformity with the input information. The state of the memory is read out through the sensing leads 26 by the sensing means 24. In this exemplary embodiment the sensing means 26 are attached so as to sense the arithmetic sum of the voltage signals produced by each bistable unit 27. The sensing means 24 can be internally connected so as to present, at the output port 28, the signals from each group of bistable units 27 or some arithmetic combination of these signals. The device shown is a linear array, however, two dimentional arrays using coincident current techniques are also contemplated.

Figure 3:
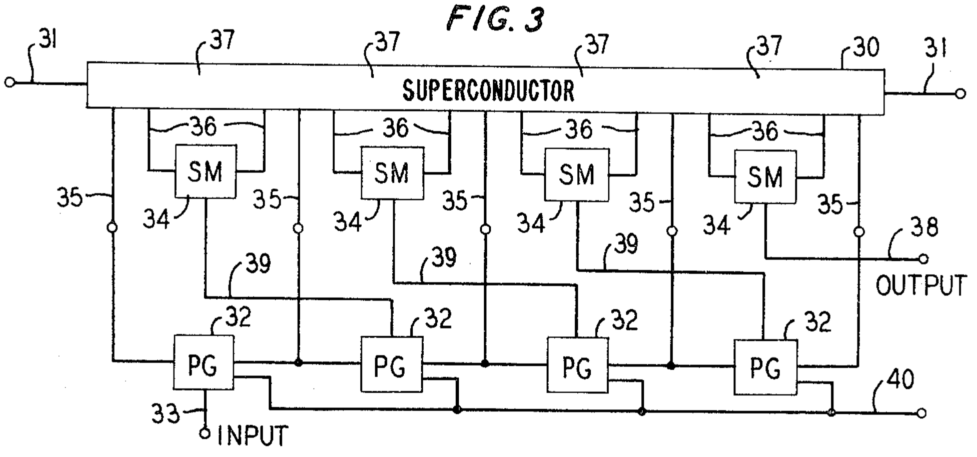
FIG. 3 is a schematic representation of an exemplary shift register.

FIG. 3 shows an exemplary shift register device employing the disclosed bistable units. As before, the superconductor strip 30 is dc biased through the bias leads 31. A set of pulse generators 32 is connected serially to strip 30 by the pulse leads 35. The memory state of each bistable portion 37 is sensed by a series of sensing means 34 via the sensing leads 36. The desired information is read into the shift register through the input port 33 into the leftmost of the array of pulse generators 32. Each sensing means 34 except for the rightmost member is connected to the succeeding member 32 of the pulse generator array via the state lead 39. The pulse generators 32 are arranged to generate a pulse polarity in conformity with the signal present at the input lead 33 or the state leads 39 when triggered by a clocking pulse from the clock input 40. After each clocking pulse the state of the rightmost bistable unit is read out of the shift register at the output port 38. In this manner information is fed into the register at the left, shifted to the right and fed out at the right. The devices of FIGS. 2 and 3 are only exemplary of the many multistable memory, logical and switching devices which can be designed by a skilled worker in the art making use of the principles of the invention.

What is claimed is:

1. A device comprising an array of bistable units electrically connected to electrical means CHARACTERIZED IN THAT a. each bistable unit consists essentially of a strip of a sputtered layer of superconductor material between 75 angstroms and 1,000 angstroms in thickness and b. the electrical means comprises

1. current bias means for passing a unidirectional bias current through each of the bistable units,

2. current pulse means for passing current pulses of either polarity through each of the bistable units, and

3. sensing means for sensing the resistive state of at least one of the bistable units.

2. A device of claim 1 in which the array includes at least one group of series connected bistable units with the sensing means associated with each group including means for sensing the sum of the voltage outputs of the bistable units contained in that group.

3. A device of claim 1 in which the superconductor material contains at least 50 atom percent of one element selected from the group consisting of niobium, tantalum and vanadium.

4. A device of claim 3 in which the superconductor material is niobium.

5. A device of claim 3 in which the sensing means includes means for sensing the derivative of the voltage signal appearing across at least one of the bistable units.

6. A device of claim 3 in which the sputtered layer is between 100 and 200 angstroms in thickness.

7. A device of claim 6 in which the substrate is held at a temperature between 500° C and 1,300° C during sputtering

8. A device of claim 7 in which the bias current is no greater than 30 milliamperes per square micrometer of cross-sectional area of the strip.

* * * * *